Patented July 23, 1929.

1,721,803

UNITED STATES PATENT OFFICE.

WILLIAM E. CARSON, OF RIVERTON, VIRGINIA.

PROCESS OF PREPARING LIMESTONE.

No Drawing.   Application filed August 21, 1926.  Serial No. 130,776.

This invention relates to processes of preparing limestone; and it comprises a method of making marketable comminuted limestone fertilizers wherein quarried limestone is mixed with the amount of quicklime necessary to take up the moisture present and give a dry preparation capable of convenient crushing, shipment and handling even in the coldest weather, and is then crushed and comminuted to the desired degree of fineness for fertilizer purposes; all as more fully hereinafter set forth and as claimed.

Powdered limestone and dolomite are in extensive use as fertilizers for land on which they exert a long continued slow action. The material is one which must sell at a low price and in which economies in manufacture, preparation and shipping are of great importance. As the fertilizing material is ordinarily prepared, the rock is quarried in the usual way and reduced by a crusher, being finally fine ground in a mill of any convenient type. Often a hammer mill is used. Comminution may be carried to 100 mesh or finer. Considerations of cost do not permit drying at any stage during these operations; the rock is reduced with whatever water may be present and frequently, and particularly in winter, this amount is considerable. In shipment and handling, this moisture is extremely inconvenient. Much of the movement is in wintertime and sometimes the material freezes in the cars and is difficult to handle.

Drying the stone, either before or after it is pulverized, in any of the ordinary ways before shipping to the farmer or dealer is impracticable, because of considerations of cost. In the present invention, I obviate the noted disadvantages of moist, fine ground limestone by adding to the material before it reaches the final mills about the amount of quicklime necessary to take up chemically the water present, using ordinary quicklime for this purpose. Theoretically, each pound of water requires about three pounds of lime. The limestone so treated may be any of the ordinary forms of limestones employed for fertilizing purposes. It may be a high calcium limestone or a dolomite. The lime may be added to the material while it is going through the mills. The quicklime is very readily distributed into and through the fine ground limestone while being pulverized in the mills, even when it is quite wet, as it dries the limestone quickly, producing a dry mass which can be conveniently shipped, stored and handled. It requires much less labor in handling. It cannot, of course, freeze in the cars. Sometimes, I add the lime to the material coming from the mills.

The amount of quicklime necessary for completely drying any particular lot of limestone can be easily determined by ascertaining the amount of sensible moisture present in the limestone by a drying test and adding to the limestone about three pounds of powdered quicklime for every pound of water present. Either a high calcium lime or a low calcium lime may be used in drying, but in either event I employ enough actual CaO to give the stated proportion.

The caustic lime added is converted into hydrated lime. The presence of this hydrated lime is not disadvantageous in the fertilizer and, on the contrary, is desirable as giving an accelerated first action in the soil.

It is seldom that it is desirable to add the exact amount of lime corresponding to the exact amount of water present. Less than this quantity of lime will often produce a material dry enough to handle in the mills and not freezing in cold weather. On the other hand, it is advantageous in many cases to use some additional lime; that is, more than is actually required by the moisture which happens to be present. This gives a dry material which will remain dry enough when exposed to moisture-laden air.

What I claim is:—

In the manufacture of dry ground limestone suitable for fertilizer purposes, the process which comprises mixing moist limestone with quicklime and then grinding the mixture produced thereby to form a pulverulent material, the amount of quicklime added being such that the said pulverulent material will not contain sufficient free moisture to form a hard solid cake when subjected to a temperature below freezing.

In testimony whereof, I have hereunto affixed my signature.

WILLIAM E. CARSON.